E. B. DECKER.
THREE-HORSE EQUALIZER.
No. 189,435. Patented April 10, 1877.
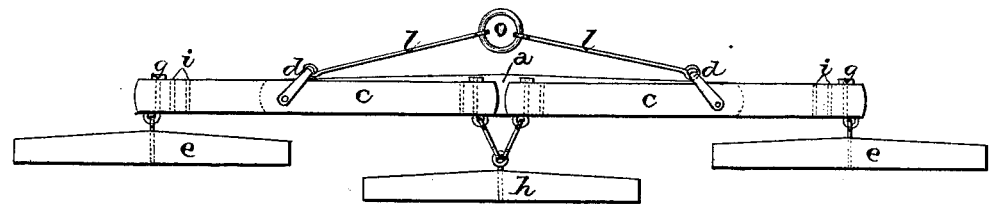

UNITED STATES PATENT OFFICE.

EDWARD B. DECKER, OF ROCKBRIDGE, ILLINOIS.

IMPROVEMENT IN THREE-HORSE EQUALIZERS.

Specification forming part of Letters Patent No. 189,435, dated April 10, 1877; application filed October 26, 1876.

*To all whom it may concern:*

Be it known that I, EDWARD B. DECKER, of Rockbridge, in the county of Greene and State of Illinois, have invented certain new and useful Improvements in Draft-Equalizer; and I do hereby declare the following to be a full, clear, and exact description of the invention, such as will enable others skilled in the art to which it pertains to-make and use it, reference being had to the accompanying drawings, which form part of this specification.

My invention relates to an improvement in three-horse equalizers; and it consists in the construction and arrangement of clevises and rods with the evener or spreader-bar and double-trees, whereby the said double-trees and bar are connected together at the ends of the latter by the clevises, which, in conjunction with the rods, form a loose or yielding connection between the equalizer and the plow, reaper, &c., to which it may be attached, the strain upon the bar being in a line from its ends to a point somewhat in rear of the same.

The accompanying drawing represents my invention.

$a$ represents the spreader-bar, or bar to which the two double-trees $c$ are pivoted, one at each end, by means of the clevis $d$. At the outer and shorter end of each double-tree is attached the single-tree $e$ by means of a screw eyebolt, $g$, each double-tree having two or more holes, $i$, through its end, so that the bolt can be transferred from one to the other, thereby changing the leverage of the horse on the double-trees to suit any and all requirements. To the inner and longer ends of both double-trees is attached the third single-tree $h$ for the third horse, either by means of the devices here shown, or any others that may be preferred.

The clevises $d$ have more or less play or swing around their pivotal points, and to each of the clevises $d$ is attached a rod, $l$. These two rods have their inner ends connected together by means of a ring, $o$, which ring $o$ serves as a means of attachment to the plow, reaper, or other machine to be used.

It will be seen that the double-trees and the rods are both attached to the spreader-bar at its ends only, thereby causing the whole draft to be exerted endwise instead of on the middle of the bar, as is usually the case, which is a great desideratum in three-horse equalizers, where the bar is subjected to great strain; and by this arrangement of rods and clevises, a yielding connecting device for attaching the equalizer to a plow, harvester, &c., is afforded, which, at the same time, serves to connect the double-trees and spreader-bar together.

Double-trees have, in most instances, been connected with plows, &c., by rods at their ends; but the present novel arrangement of such is expressly limited to three-horse equalizers, in which the spreader-bar, which is to be connected with the plow, is subjected to the strain arising by the draft upon the double-trees.

I am aware that the idea of applying the draft to the two ends of the spreader-bar or evener is not new, and this I broadly disclaim.

Having thus described my invention, I claim—

The construction and arrangement of the ring $o$, rods $l$, and clevises $d$ $d$ with the double-trees $c$ $c$, and ends of the spreader-bar $a$, whereby the double-trees and bar are connected, as shown, and a yielding connecting device for attaching the equalizer to a plow, or the like, afforded, substantially in the manner and for the purposes specified.

In testimony that I claim the foregoing I have hereunto set my hand this 10th day of October, 1876.

EDWARD B. DECKER.

Witnesses:
SAM. DIXON,
JOHN F. ROACH.